US010001412B2

(12) United States Patent
Inoue et al.

(10) Patent No.: US 10,001,412 B2
(45) Date of Patent: Jun. 19, 2018

(54) WAVEFORM MEASUREMENT DEVICE AND PULSED-LIGHT-GENERATING DEVICE

(71) Applicant: HAMAMATSU PHOTONICS K.K., Hamamatsu-shi, Shizuoka (JP)

(72) Inventors: Takashi Inoue, Hamamatsu (JP); Koyo Watanabe, Hamamatsu (JP); Koji Takahashi, Hamamatsu (JP); Naoya Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 71 days.

(21) Appl. No.: 15/303,900

(22) PCT Filed: Apr. 8, 2015

(86) PCT No.: PCT/JP2015/061006
§ 371 (c)(1),
(2) Date: Oct. 13, 2016

(87) PCT Pub. No.: WO2015/163149
PCT Pub. Date: Oct. 29, 2015

(65) Prior Publication Data
US 2017/0030776 A1    Feb. 2, 2017

(30) Foreign Application Priority Data
Apr. 22, 2014    (JP) .................. 2014-087971

(51) Int. Cl.
*G01J 11/00* (2006.01)
*G02B 5/32* (2006.01)
*G01J 9/00* (2006.01)

(52) U.S. Cl.
CPC ............. *G01J 11/00* (2013.01); *G01J 9/00* (2013.01); *G02B 5/32* (2013.01); *G02F 2203/56* (2013.01)

(58) Field of Classification Search
CPC .................. G01J 11/00; G02F 1/01
See application file for complete search history.

(56) References Cited

U.S. PATENT DOCUMENTS 9,337,922 B2 *  5/2016  Konishi ............... G01J 11/00
9,778,138 B2 * 10/2017  Konishi ............ G01M 11/338
2011/0311223 A1  12/2011  Konishi et al.

FOREIGN PATENT DOCUMENTS

| JP | 2007-110089 A | 4/2007 |
| JP | 2010-204308 A | 9/2010 |
| JP | 2013-170905 A | 9/2013 |

OTHER PUBLICATIONS

International Preliminary Report on Patentability dated Nov. 3, 2016 for PCT/JP2015/061006.
(Continued)

*Primary Examiner* — Tony Ko
(74) *Attorney, Agent, or Firm* — Drinker Biddle & Reath LLP

(57) ABSTRACT

A waveform measurement device includes an input spectrum acquisition unit for acquiring an input intensity spectrum being an intensity spectrum of pulsed light, an optical element inputting the pulsed light and outputting light having an intensity spectrum corresponding to a phase spectrum of the pulsed light, an output spectrum acquisition unit for acquiring an output intensity spectrum being an intensity spectrum of the light output from the optical element, and a phase spectrum determination unit for determining the phase spectrum of the pulsed light by comparing an output intensity spectrum calculated when the pulsed light having an input intensity spectrum and a virtual phase spectrum is assumed to be input to the optical element with the output intensity spectrum acquired in the output spec-
(Continued)

trum acquisition unit. The phase spectrum determination unit sets the virtual phase spectrum by deforming the control phase spectrum.

5 Claims, 15 Drawing Sheets

(56) References Cited

OTHER PUBLICATIONS

L. Jiang et al., "High-throughput rear-surface drilling of microchannels in glass based on electron dynamics control using femtosecond pulse trains", Optics Letters, vol. 37, No. 14, Jul. 15, 2012, p. 2781-2783.
P. Xi et al., "Two-photon imaging using adaptive phase compensated ultrashort laser pulses", Journal of Biomedical Optics, 14(1), 014002, Jan./Feb. 2009, p. 014002-1-p. 014002-7.

* cited by examiner

Fig.3
(a)
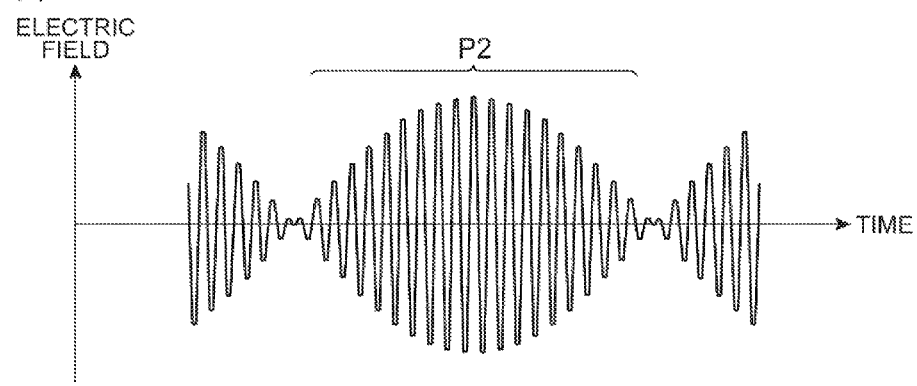
(b)
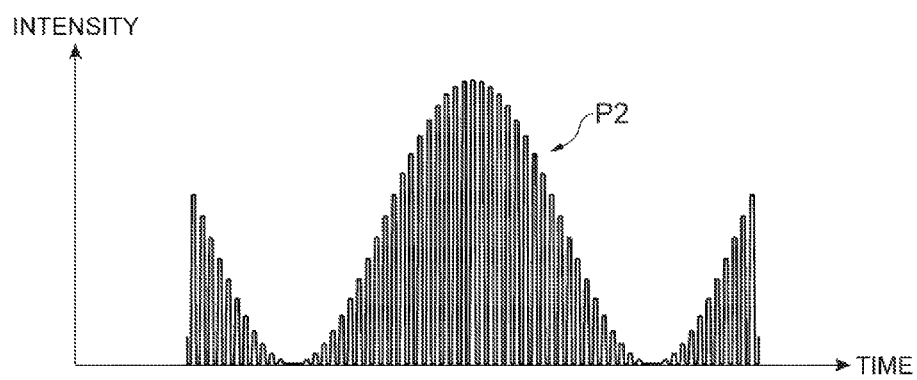

*Fig.4*
(a)
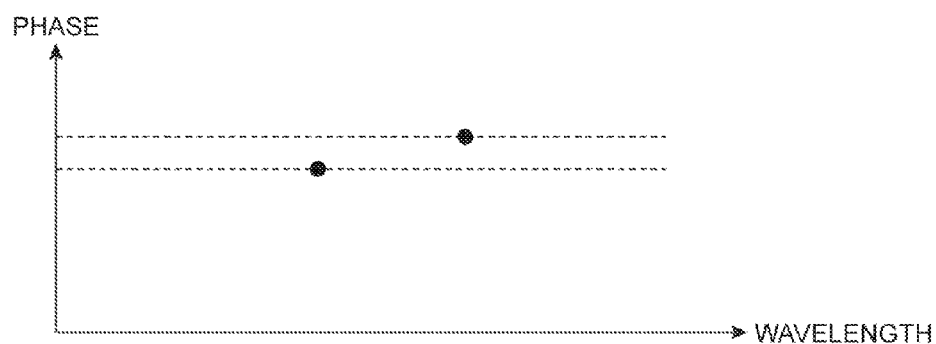
(b)
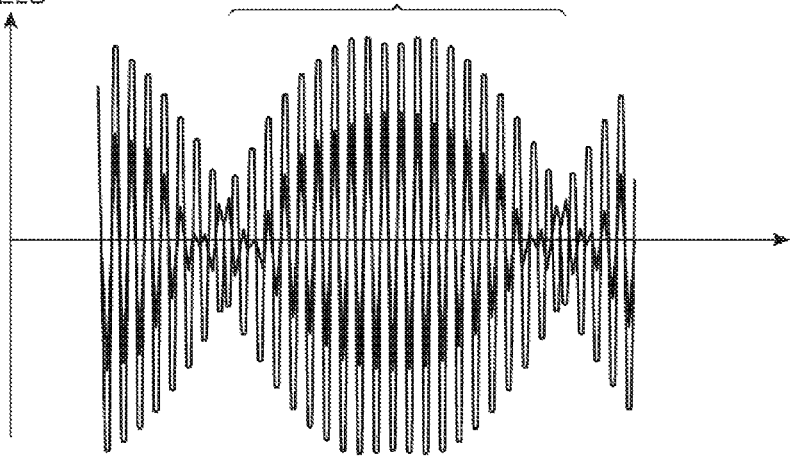

Fig.5
(a)
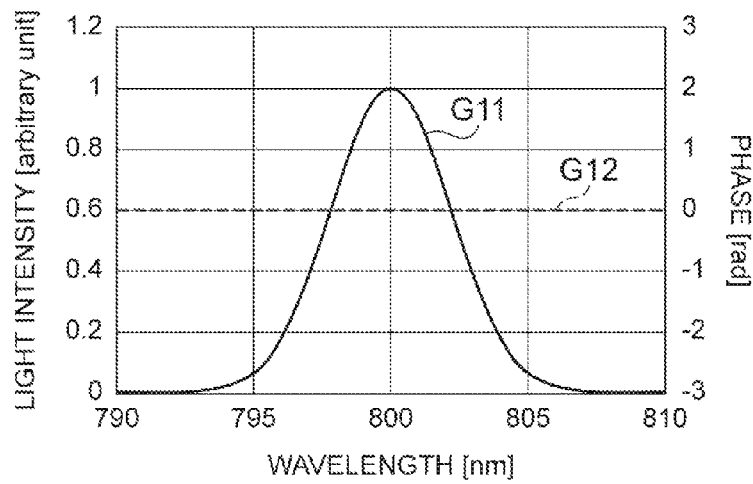
(b)
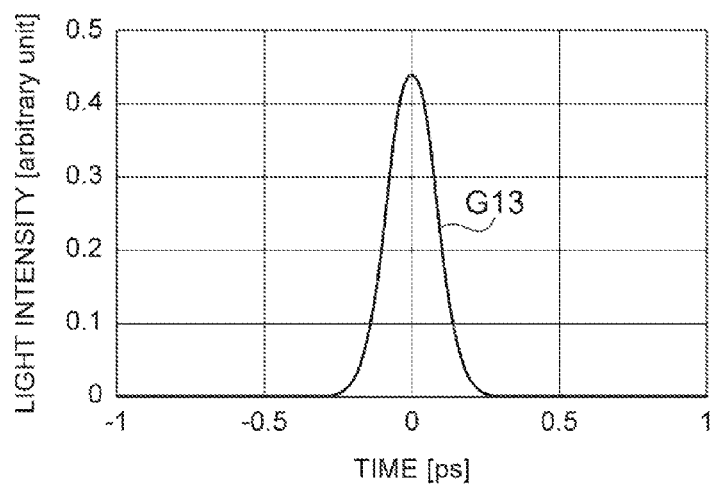

Fig.6
(a)
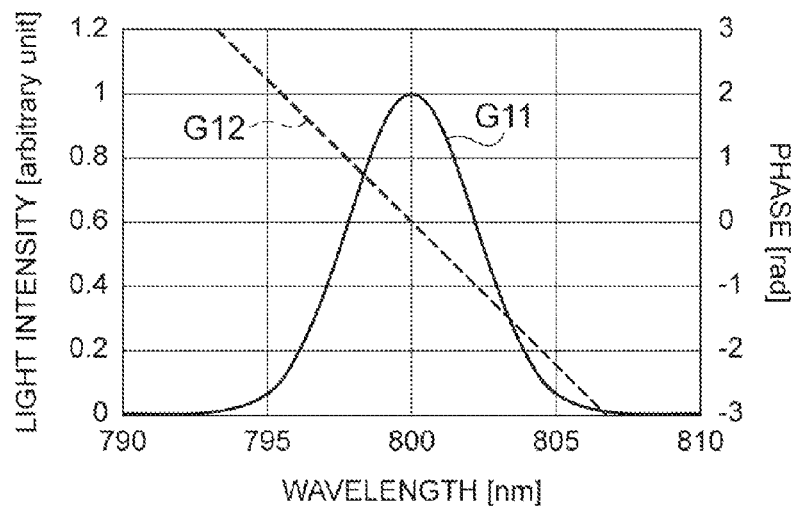
(b)
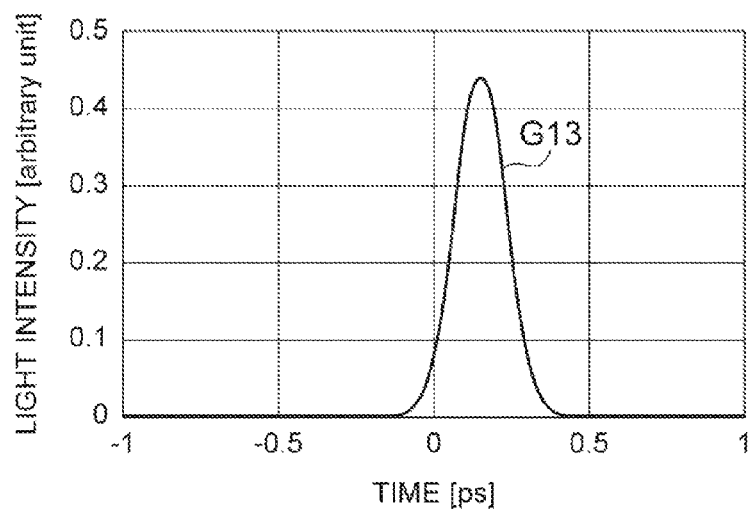

Fig.7
(a)
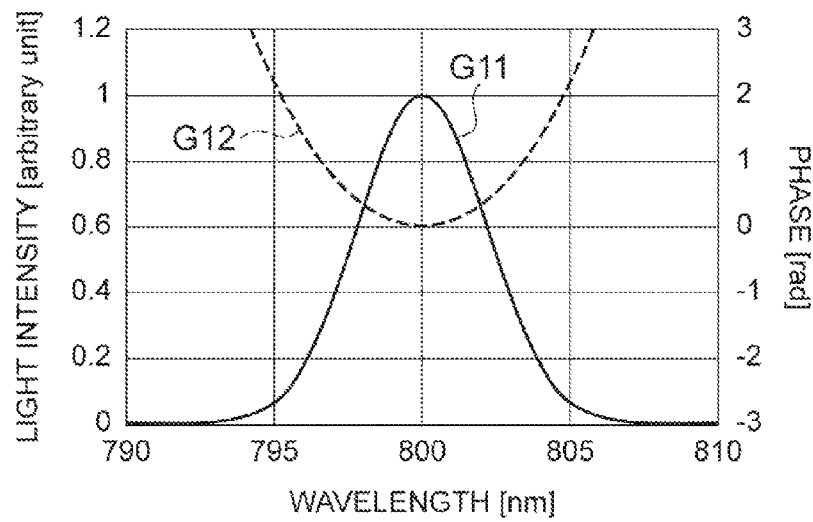
(b)
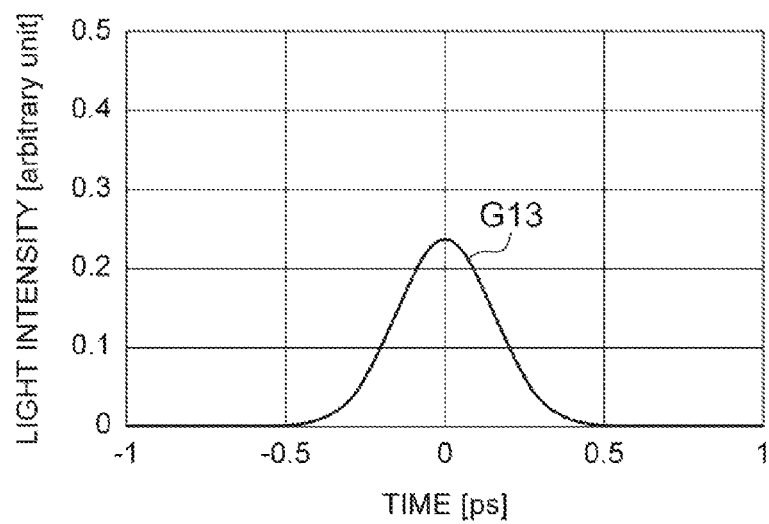

Fig.8
(a)
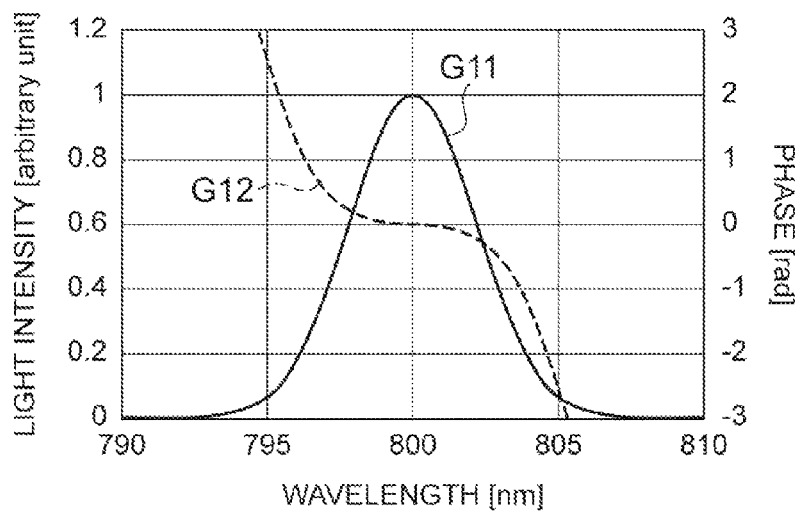
(b)
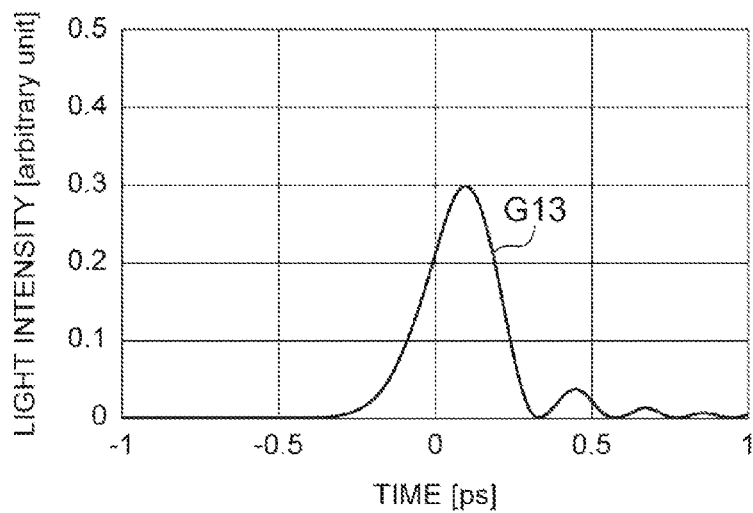

*Fig.9*
(a)
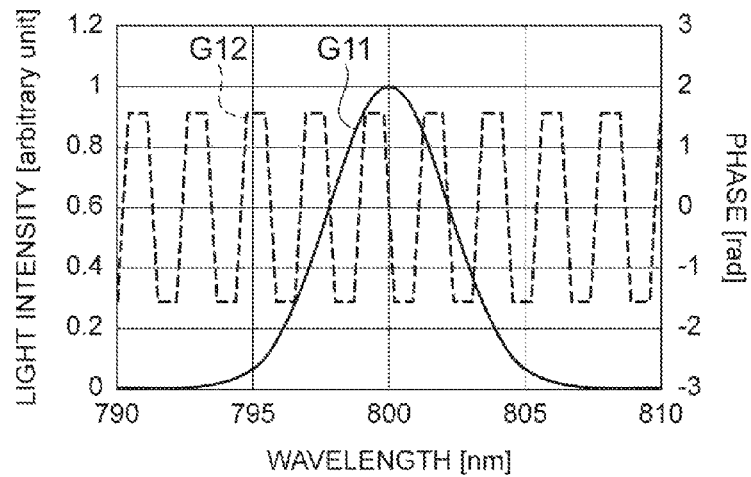
(b)
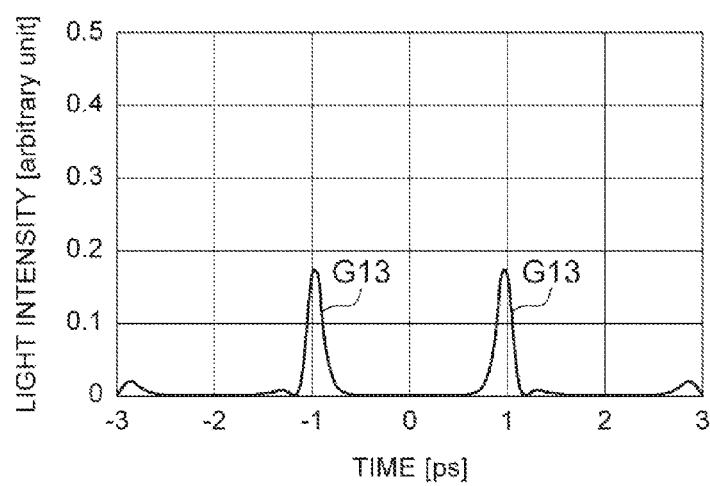

Fig.10
(a)
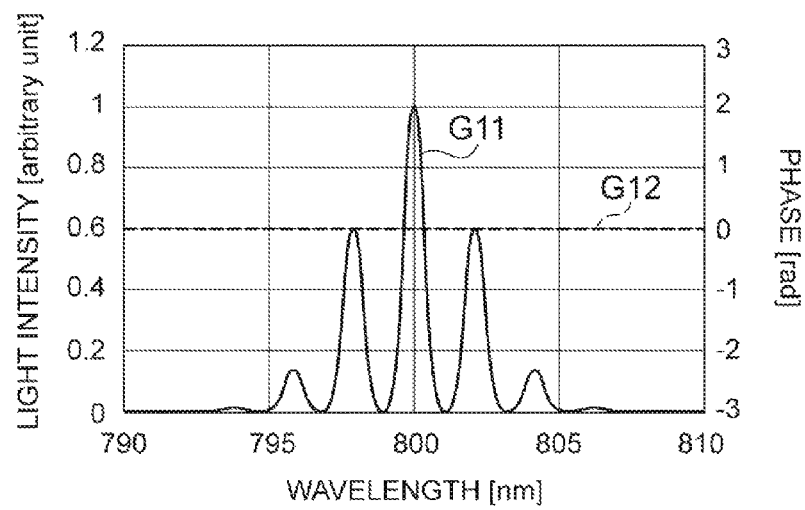
(b)
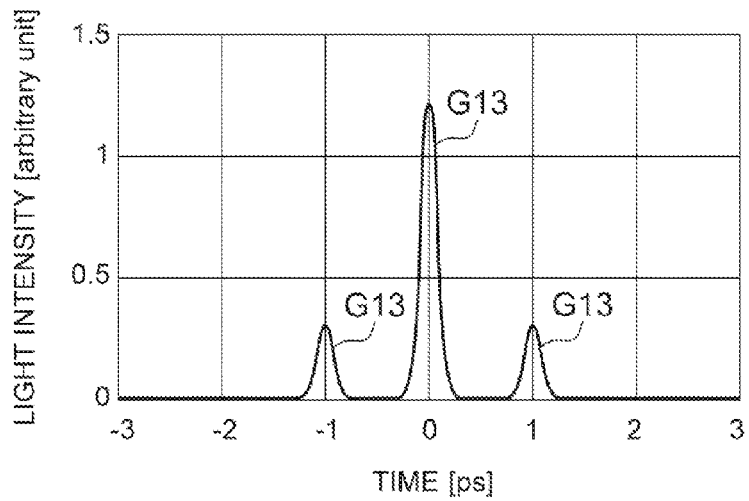

WAVEFORM MEASUREMENT DEVICE AND PULSED-LIGHT-GENERATING DEVICE

TECHNICAL FIELD

The one aspect of the present invention relates to a waveform measurement device and a pulsed light generating device.

BACKGROUND ART

In recent years, a laser machining device, a microscope, or the like using ultrashort pulsed light having a very short time width such as on the order of attoseconds to nanoseconds has been developed. Further, an information communication system using a nonlinear optical effect has been developed. For example, in such technical field, it is preferable to generate ultrashort pulsed light having a desired time waveform.

The desired time waveform of the ultrashort pulsed light is obtained, for example, by causing light having various wavelength components to overlap and adjusting a phase of each wavelength component. In order to more accurately realize the desired time waveform, a time waveform of generated ultrashort pulsed light may be measured, and a result of the measurement may be fed back for adjustment of the phase of each wavelength component. Patent Literatures 1 and 2 disclose waveform reconstruction devices for accurately measuring a time waveform of ultra short pulsed light.

CITATION LIST

Patent Literature

[Patent Literature 1] Japanese Unexamined Patent application Publication No. 2010-204308
[Patent Literature 2] Japanese Unexamined Patent application Publication No. 2013-170905

SUMMARY OF INVENTION

Technical Problem

Since a time width of ultrashort pulsed light is very short, it is difficult to directly measure a time waveform of the ultrashort pulsed light. Accordingly, a scheme of individually obtaining an intensity spectrum corresponding to overlapping of various wavelength components and a phase spectrum corresponding to adjusting of a phase of each wavelength component and calculating a time waveform of ultrashort pulsed light on the basis of the spectra has been studied.

Here, the intensity spectrum of the ultrashort pulsed light can be relatively easily measured. However, the measurement of the phase spectrum of the ultrashort pulsed light is not easy. Examples of a scheme of measuring the phase spectrum include a Frequency Resolved Optical Gating (FROG) measurement method, a Spectral Interferometry for Direct Electric Field Reconstruction (SPIDER) measurement method, a Temporal Analysis of Dispersing by a Pair of Light E-fields (TADPOLE) measurement method, and a Complex Electric Field Specyrum Distribution Retrival (CESDR) measurement method. There are problems in that, among these, FROG and CESDR may require iterative optimization calculation and a long time may be required to converge to an optimal solution or an accurate phase spectrum cannot be measured due to convergence to a local solution rather than an optimal solution.

One aspect of the present invention has been made in view of such problems, and an object thereof is to provide a waveform measurement device and a pulsed light generating device capable of measuring a phase spectrum accurately and in a short time.

Solution to Problem

To solve the above-described problems, a waveform measurement device according to an aspect of the present invention is a device for measuring a time waveform of pulsed light obtained by modulating a phase of input light including two or more wavelength components for each wavelength in a spatial light modulator to which a phase modulation hologram based on a control phase spectrum for controlling the time waveform of the pulsed light is presented, and includes an input spectrum acquisition unit for acquiring an input intensity spectrum being an intensity spectrum of the pulsed light; an optical element inputting the pulsed light and outputting light having an intensity spectrum corresponding to the phase spectrum of the pulsed light; an output spectrum acquisition unit for acquiring an output intensity spectrum being an intensity spectrum of the light output from the optical element; a phase spectrum determination unit for determining the phase spectrum of the pulsed light by comparing the output intensity spectrum calculated when the pulsed light having the input intensity spectrum and a virtual phase spectrum is assumed to be input to the optical element with the output intensity spectrum acquired in the output spectrum acquisition unit; and a waveform calculation unit for calculating a time waveform of the pulsed light, using a frequency-time transform, on the basis of the phase spectrum determined in the phase spectrum determination unit and the input intensity spectrum, wherein the phase spectrum determination unit sets the virtual phase spectrum by deforming the control phase spectrum.

In the waveform measurement device, first, the pulsed light is input from the spatial light modulator. The input spectrum acquisition unit acquires the intensity spectrum of the pulsed light (the input intensity spectrum). Further, the optical element outputs the light having an intensity spectrum (output intensity spectrum) corresponding to the phase spectrum of the pulsed light. The output spectrum acquisition unit acquires the output intensity spectrum. The phase spectrum determination unit determines the phase spectrum of the pulsed light by setting the virtual phase spectrum of the pulsed light and comparing the output intensity spectrum calculated when the pulsed light having the input intensity spectrum and the virtual phase spectrum is assumed to be input to the optical element with the output intensity spectrum acquired in the output spectrum acquisition unit. The phase spectrum determination unit may repeatedly set the virtual phase spectrum so that the calculated output intensity spectrum approaches an actual output intensity spectrum. The waveform calculation unit calculates the time waveform of the pulsed light, using a frequency-time transform, on the basis of the phase spectrum determined in the phase spectrum determination unit and the input intensity spectrum. According to the above configuration, it is possible to individually obtain the intensity spectrum and the phase spectrum of the pulsed light, and to calculate the time waveform of the pulsed light on the basis of the intensity spectrum and the phase spectrum.

Further, in the waveform measurement device, the phase spectrum determination unit sets the virtual phase spectrum by deforming the control phase spectrum. The phase spectrum forming a time waveform of the pulsed light is mainly influenced by the control phase spectrum. Therefore, the phase spectrum is not often greatly changed from the control phase spectrum. Accordingly, by setting the virtual phase spectrum on the basis of the control phase spectrum, it is possible to reduce the calculation amount in the phase spectrum determination unit and shorten a time required for measurement of the phase spectrum.

In the above waveform measurement device, the phase spectrum determination unit may perform a calculation for optimizing the virtual phase spectrum so that the output intensity spectrum calculated when the pulsed light having the input intensity spectrum and the virtual phase spectrum is assumed to be input to the optical element approaches the output intensity spectrum acquired in the output spectrum acquisition unit, and use the control phase spectrum as an initial value of the virtual phase spectrum in the calculation. Accordingly, it is possible to obtain the virtual phase spectrum close to the actual phase spectrum accurately and in a short time.

Further, in order to solve the above-described problems, a pulsed light generating device according to an aspect of the present invention is a device for generating pulsed light having a desired time waveform, and includes a light output unit that generates input light including two or more wavelength components; a spatial light modulator presented with a phase modulation hologram based on a control phase spectrum for controlling a time waveform of pulsed light, and for modulating a phase of the input light in order to generate the pulsed light, for each wavelength; a control unit for providing the phase modulation hologram to the spatial light modulator; and a waveform measurement unit for measuring a time waveform of the pulsed light, wherein the control unit adjusts the phase modulation hologram so that the time waveform of the pulsed light approaches a desired waveform on the basis of a measurement result in the waveform measurement unit, the waveform measurement unit includes: an input spectrum acquisition unit for acquiring an input intensity spectrum being an intensity spectrum of the pulsed light; an optical element inputting the pulsed light and outputting light having an intensity spectrum corresponding to the phase spectrum of the pulsed light; an output spectrum acquisition unit for acquiring an output intensity spectrum being an intensity spectrum of the light output from the optical element; a phase spectrum determination unit for determining the phase spectrum of the pulsed light by comparing the output intensity spectrum calculated when the pulsed light having the input intensity spectrum and a virtual phase spectrum is assumed to be input to the optical element with the output intensity spectrum acquired in the output spectrum acquisition unit; and a waveform calculation unit for calculating a time waveform of the pulsed light, using a frequency-time transform, on the basis of the phase spectrum determined in the phase spectrum determination unit and the input intensity spectrum and the phase spectrum determination unit sets the virtual phase spectrum by deforming the control phase spectrum.

In the pulsed light generating device, first, the light output unit generates input light including two or more wavelength components. Then, the spatial light modulator modulates the phase of the input light for each wavelength in order to output the pulsed light in which the time waveform of the input light is changed. In this case, the control unit provides the phase modulation hologram based on the control phase spectrum for controlling the time waveform of the pulsed light to the spatial light modulator. The waveform measurement unit measures the time waveform of the pulsed light. A configuration and an operation of the waveform measurement unit are the same as those of the waveform measurement device described above.

Further, in the waveform measurement unit, the phase spectrum determination unit deforms the control phase spectrum to set the virtual phase spectrum. Therefore, according to this pulsed light generating device, it is possible to reduce the calculation amount in the phase spectrum determination unit and shorten a time required for measurement of the phase spectrum, as in the above-described waveform measurement unit.

In the pulsed light generating device, the phase spectrum determination unit may perform a calculation for optimizing the virtual phase spectrum so that the output intensity spectrum calculated when the pulsed light having the input intensity spectrum and the virtual phase spectrum is assumed to be input to the optical element approaches the output intensity spectrum acquired in the output spectrum acquisition unit, and use the control phase spectrum as an initial value of the virtual phase spectrum in the calculation. Accordingly, it is possible to obtain the virtual phase spectrum close to an actual phase spectrum accurately and in a short time.

Advantageous Effects of Invention

According to the waveform measurement device and the pulsed light generating device according to an aspect of the present invention, it is possible to measure the phase spectrum accurately and in a short time.

BRIEF DESCRIPTION OF DRAWINGS

FIGS. 3(a) and 3(b) are graphs illustrating an example of a time change of an electric field and a light intensity when two or more wavelength components overlap.

FIG. 4(a) is a graph illustrating an example of a phase spectrum of beat light, and FIG. 4(b) is a diagram illustrating a state in which an envelope of the beat light is shifted in a time direction.

FIGS. 5(a) and 5(b) are graphs illustrating a time waveform generated by phase modulation for each wavelength component, with FIG. 5(a) illustrating a combination of an intensity spectrum and a phase spectrum of pulsed light, and FIG. 5(b) illustrating a time waveform realized in the pulsed light in combination with FIG. 5(a).

FIGS. 6(a) and 6(b) are graphs illustrating a time waveform generated by phase modulation for each wavelength component, with FIG. 6(a) illustrating a combination of an intensity spectrum and a phase spectrum of pulsed light, and FIG. 6(b) illustrating a time waveform realized in the pulsed light in combination with FIG. 6(a).

FIGS. 7(a) and 7(b) are graphs illustrating a time waveform generated by phase modulation for each wavelength component, with FIG. 7(a) illustrating a combination of an intensity spectrum and a phase spectrum of pulsed light, and FIG. 7(b) illustrating a time waveform realized in the pulsed light in combination with FIG. 7(a).

FIGS. 8(a) and 8(b) are graphs illustrating a time waveform generated by phase modulation for each wavelength component, with FIG. 8(a) illustrating a combination of an intensity spectrum and a phase spectrum of pulsed light, and FIG. 8(b) illustrating a time waveform realized in the pulsed light in combination with FIG. 8(a).

FIGS. 9(a) and 9(b) are graphs illustrating a time waveform generated by phase modulation for each wavelength component, with FIG. 9(a) illustrating a combination of an intensity spectrum and a phase spectrum of pulsed light, and FIG. 9(b) illustrating a time waveform realized in the pulsed light in combination with FIG. 9(a).

FIGS. 10(a) and 10(b) are graphs illustrating a time waveform generated by phase modulation for each wavelength component, with FIG. 10(a) illustrating a combination of an intensity spectrum and a phase spectrum of pulsed light, and FIG. 10(b) illustrating a time waveform realized in the pulsed light in combination with FIG. 10(a).

DESCRIPTION OF EMBODIMENTS

Figure 1:
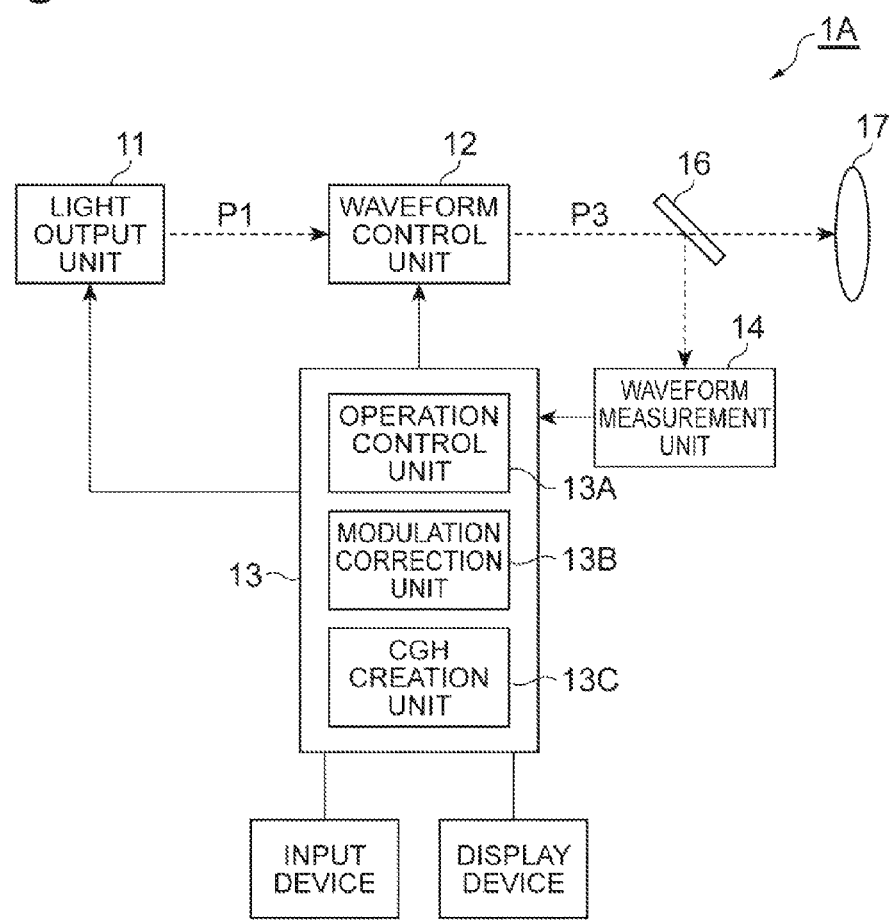
FIG. 1 is a block diagram illustrating a configuration of a pulsed light generating device according to an embodiment.

An embodiment of a waveform measurement device and a pulsed light generating device according to an aspect of the present invention will be described in detail with reference to the accompanying drawings. In the description of the drawings, the same elements are denoted with the same reference numerals, and repeated description will be omitted.

FIG. 1 is a block diagram illustrating a configuration of a pulsed light generating device 1A according to an embodiment. As illustrated in FIG. 1, the pulsed light generating device 1A of this embodiment includes a light output unit 11, a waveform control unit 12, a control unit 13, and a waveform measurement unit (waveform measurement device) 14.

Figure 2:
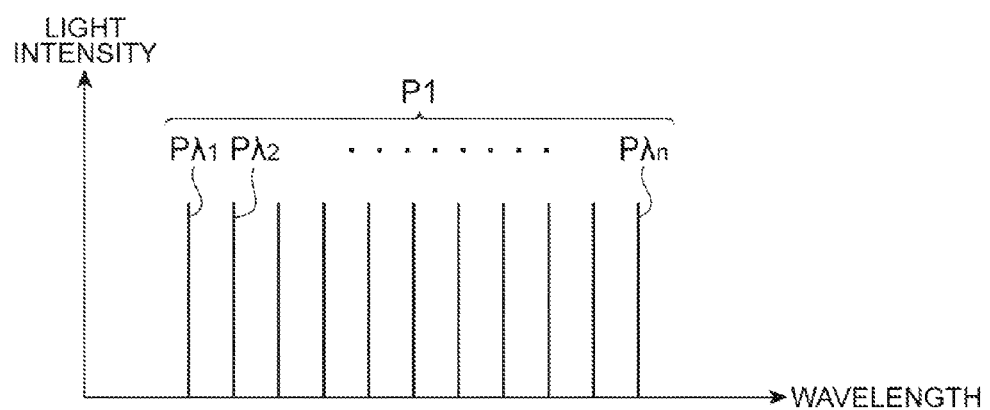
FIG. 2 is a graph illustrating an example of an intensity distribution of each wavelength of input light.

The light output unit 11 generates input light P1 including two or more wavelength components. This input light P1 is, for example, laser pulsed light having a time width on the order of femtoseconds. Alternatively, the input light P1 may be incoherent pulsed light. When the input light P1 is the incoherent light, for example, a light emitting diode (LED) light source, a super luminescent diode (SLD) light source, or an amplified spontaneous emission (ASE) light source may be used as the light output unit 11. FIG. 2 illustrates a graph illustrating an example of an intensity distribution of each wavelength of the input light P1. In this example, different wavelength components $P\lambda_1$ to $P\lambda_n$ are included in the input light P1.

The waveform control unit 12 modulates a phase and an intensity (amplitude) of the input light P1 for each wavelength component to generate pulsed light P3 having an arbitrary time waveform changing from the input light P1. Here, FIGS. 3(a) and 3(b) are graphs illustrating an example of a time change of an electric field and a light intensity when two or more wavelength components overlap. As illustrated in FIGS. 3(a) and 3(b), if two or more wavelength components overlap, the wavelength components interfere with each other and a pulsed beat light P2 is generated. A time waveform (envelope) of the beat light P2 can further change due to an individual change in phases of the wavelength components. FIG. 4(a) is a graph illustrating an example of a phase spectrum of the beat light P2. The waveform control unit 12 controls a phase of each wavelength of the beat light P2, for example, as illustrated in FIG. 4(a). Accordingly, as illustrated in FIG. 4(b), the envelope of the beat light P2 is shifted in a time direction. FIG. 4 illustrates a change, for example, when phases of two wavelength components are made different. If the number n of wavelength components $P\lambda_1$ to $P\lambda_n$ is equal to or greater than three, more various changes in time waveforms are generated in the beat light P2. The light of which the time waveform has changed in this manner is output from the waveform control unit 12 as the pulsed light P3.

FIGS. 5 to 10 illustrate graphs illustrating various time waveforms that are generated due to phase modulation and intensity modulation of each wavelength component. FIGS. 5(a), 6(a), 7(a), 8(a), 9(a), and 10(a) illustrate a combination of an intensity spectrum G11 and a phase spectrum G12 of the pulsed light P3. Further, FIGS. 5(b), 6(b), 7(b), 8(b), 9(b), and 10(b) illustrate a time waveform (time intensity waveform) G13 in the pulsed light P3 realized through the combination in FIGS. 5(a), 6(a), 7(a), 8(a), 9(a), and 10(a).

As illustrated in FIG. 5, when the phase spectrum G12 is flat, a time waveform G13 becomes substantially the same as the time waveform of the input light P1. On the other hand, as illustrated in FIG. 6, when the phase spectrum G12 is a linear function, the time waveform G13 becomes a waveform obtained by shifting the time waveform of the input light P1 in a time direction. Further, as illustrated in FIG. 7, when the phase spectrum G12 is a quadric function, the time waveform G13 is a waveform obtained by widening a time width of the input light P1. Further, as illustrated in FIG. 8, when the phase spectrum G12 is a tertiary function, the time waveform G13 becomes a waveform that is asymmetrical in a time direction. Further, as illustrated in FIG. 9, when the phase spectrum G12 is a waveform in which $-\pi/2$ (rad) and $\pi/2$ (rad) are repeated, the time waveform G13 becomes a waveform including two ultrashort pulse waveforms. As illustrated in FIG. 10, in a case in which the intensity spectrum G11 of the pulsed light P3 is cosine-modulated even when the phase spectrum G12 is flat, the time waveform G13 becomes a waveform including three ultrashort pulse waveforms.

Figure 11:
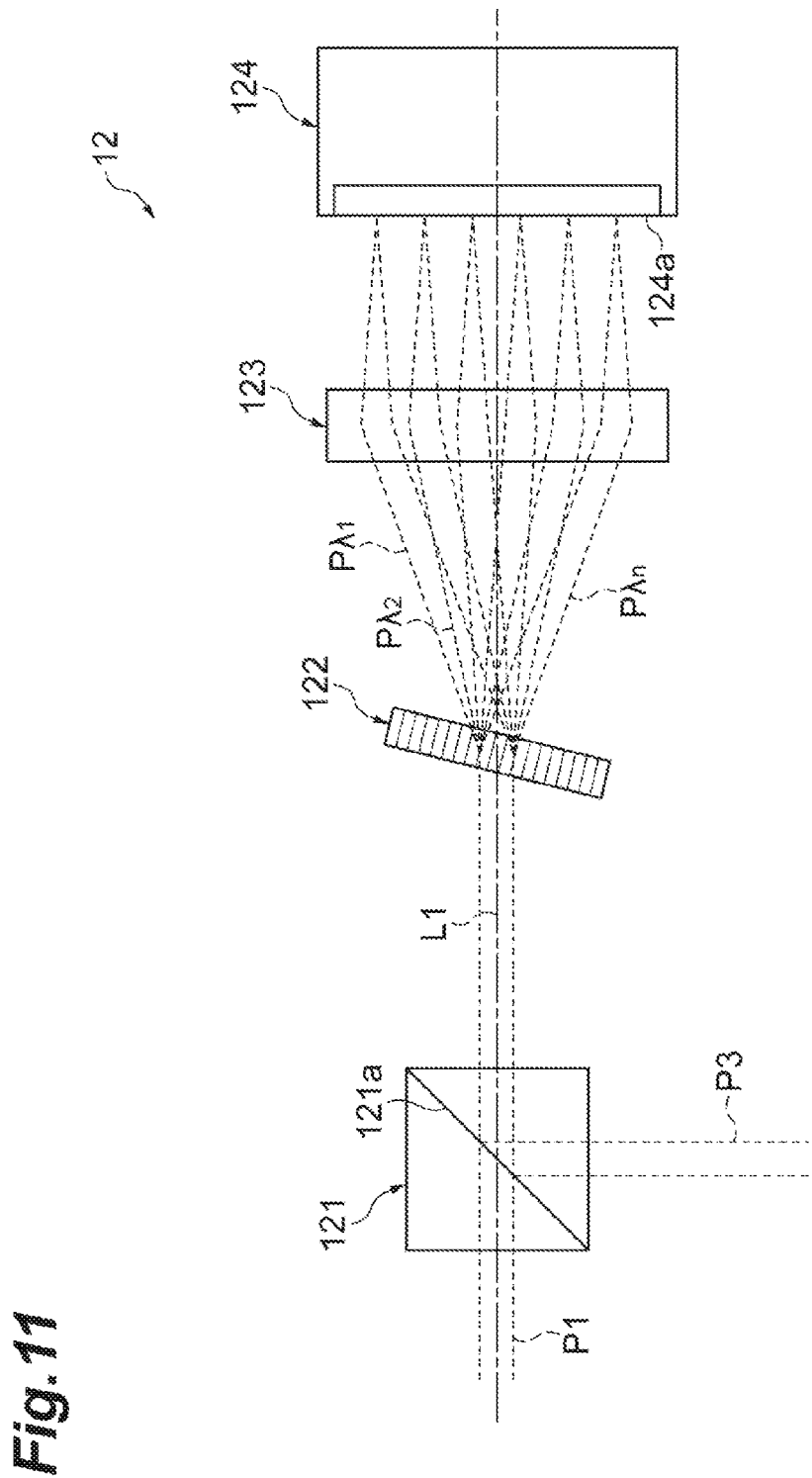
FIG. 11 is a block diagram illustrating an example of a configuration of the waveform control unit.

FIG. 11 is a block diagram illustrating a configuration example of the waveform control unit 12. As illustrated in FIG. 11, the waveform control unit 12 is optically coupled to the light output unit 11. Further, the waveform control unit 12 includes a beam splitter 121, a spectroscopic element 122, an imaging lens 123, and a spatial light modulator 124, which are arranged side by side on a predetermined optical axis L1.

The beam splitter 121 is optically coupled to the light output unit 11. The beam splitter 121 includes an optically transmissive and reflective surface 121a which is inclined with respect to the optical axis L1. The optically transmissive and reflective surface 121a transmits the input light P1 that is input from one side along the optical axis L1. The spectroscopic element 122 is optically coupled to the beam splitter 121. The spectroscopic element 122 spectrally divides the input light P1 transmitted through the beam splitter 121 into respective wavelength components $P\lambda_1$ to $P\lambda_n$. The spectroscopic element 122 may include, for example, an optical element such as a grating (a diffraction grating) or a prism. The spectroscopic element 122 may be either a reflection type or a transmission type. The respective wavelength components $P\lambda_1$ to $P\lambda_n$ spectrally divided by the spectroscopic element 122 pass through the imaging lens 123, and are formed as an image on a region corresponding to the respective wavelength components $P\lambda_1$ to $P\lambda_n$ in a light modulation surface 124a of the spatial light modulator 124. For example, a reflective imaging means such as a concave mirror may be used in place of the imaging lens 123.

The spatial light modulator 124 is optically coupled to the spectroscopic element 122. The spatial light modulator 124 modulates at least one of a phase and an intensity of the input light P1 for each wavelength in order to generate the pulsed light P3 obtained by changing the time waveform of the input light P1. Examples of the spatial light modulator 124 include a refractive index varying material type spatial light modulator (for example, a liquid crystal on silicon (LCOS) or liquid crystal display (LCD) spatial light modulator using a liquid crystal), and a segment mirror spatial light modulator, or a continuous deformable mirror type spatial light modulator. The refractive index varying material type spatial light modulator, the segment mirror spatial light modulator, or the continuous deformable mirror spatial light modulator is controlled by applying a voltage, a current, or writing light to each device. Further, the refractive index changing material spatial light modulator may be either a transmission type or reflection type. The light modulation surface 124a includes a plurality of pixels arranged in a one-dimensional or two-dimensional form, and applies an independent modulation amount to the input light P1 in each pixel. However, if both of the phase and the intensity are modulated using the one-dimensional spatial light modulator 124, a spatial light modulator for modulating the phase, and another spatial light modulator for modulating the intensity are necessary. A phase modulation hologram (CGH; Computer Generated Hologram) based on a phase spectrum (hereinafter referred to as a control phase spectrum) for controlling the time waveform of the pulsed light P3 is given to the spatial light modulator 124. Here, "a phase modulation hologram is given" refers to the fact that an electrical signal for realizing the phase modulation amount of each of the plurality of pixels included in the phase modulating hologram is provided to the spatial light modulator 124.

When the phase spectrum of the input light P1 is not flat, another phase modulation hologram for compensating for a difference between a non-flat phase spectrum and the flat phase spectrum may overlap the phase modulation hologram and may be given to the spatial light modulator 124. Further, still another phase modulation hologram for compensating for, for example, wavelength dispersion caused by various optical components between the light modulation surface 124a and an irradiation target may be superimposed on the phase modulation hologram and given to the spatial light modulator 124.

The light modulated by the spatial light modulator 124 passes through the lens 123 and the spectroscopic element 122 to be the pulsed light P3, and reaches the beam splitter 121. The optically transmissive and reflective surface 121a of the beam splitter 121 reflects the pulsed light P3 input from the other side along the optical axis L1, in a direction intersecting the optical axis L1. Thereafter, as illustrated in FIG. 1, the pulsed light P3 reaches the beam splitter 16. The beam splitter 16 is an optical element that divides the pulsed light P3, which is output from the waveform control unit 12. As the beam splitter 16, for example, a half mirror may be used. Some of the pulsed light P3 divided in the beam splitter 16 passes through an optical output optical system 17 including an optical amplifier, a lens, an optical fiber, or the like, and is radiated to an irradiation target (for example, a processing target in a laser processing device or an observation object in a microscope). Further, the rest of the pulsed light P3 divided in the beam splitter 16 is guided to a waveform measurement unit 14.

In the above-described configuration of the waveform control unit 12, an angle of the light modulation surface 124a may be adjusted without using the beam splitter 121, so that an output direction of the pulsed light P3 is different from an input direction of the input light P1 and, accordingly, the input light P1 and the pulsed light P3 may be separated from each other. Further, the pulsed light P3 output from the optical output optical system 17 may be guided to the waveform measurement unit 14 without using the beam splitter 16.

Referring back to FIG. 1, the control unit 13 may be configured of, for example, a computer including a CPU and a storage medium. The control unit 13 includes an operation control unit 13a that controls operations of the light output unit 11, the waveform control unit 12, and the waveform measurement unit 14 to be described below, a CGH creation unit 13b that creates a phase modulation hologram based on a control phase spectrum for controlling the time waveform of the pulsed light P3 output from the waveform control unit 12, and a modulation correction unit 13c that corrects the phase modulation hologram. The modulation correction unit 13c adjusts (corrects) the phase modulation hologram which is presented to the spatial light modulator 124 of the waveform control unit 12 so that the time waveform of the pulsed light P3 approaches a desired waveform with higher accuracy on the basis of a measurement result in the waveform measurement unit 14, that is, time waveform information of the pulsed light P3 (for example, a phase spectrum and an intensity spectrum).

Figure 12:
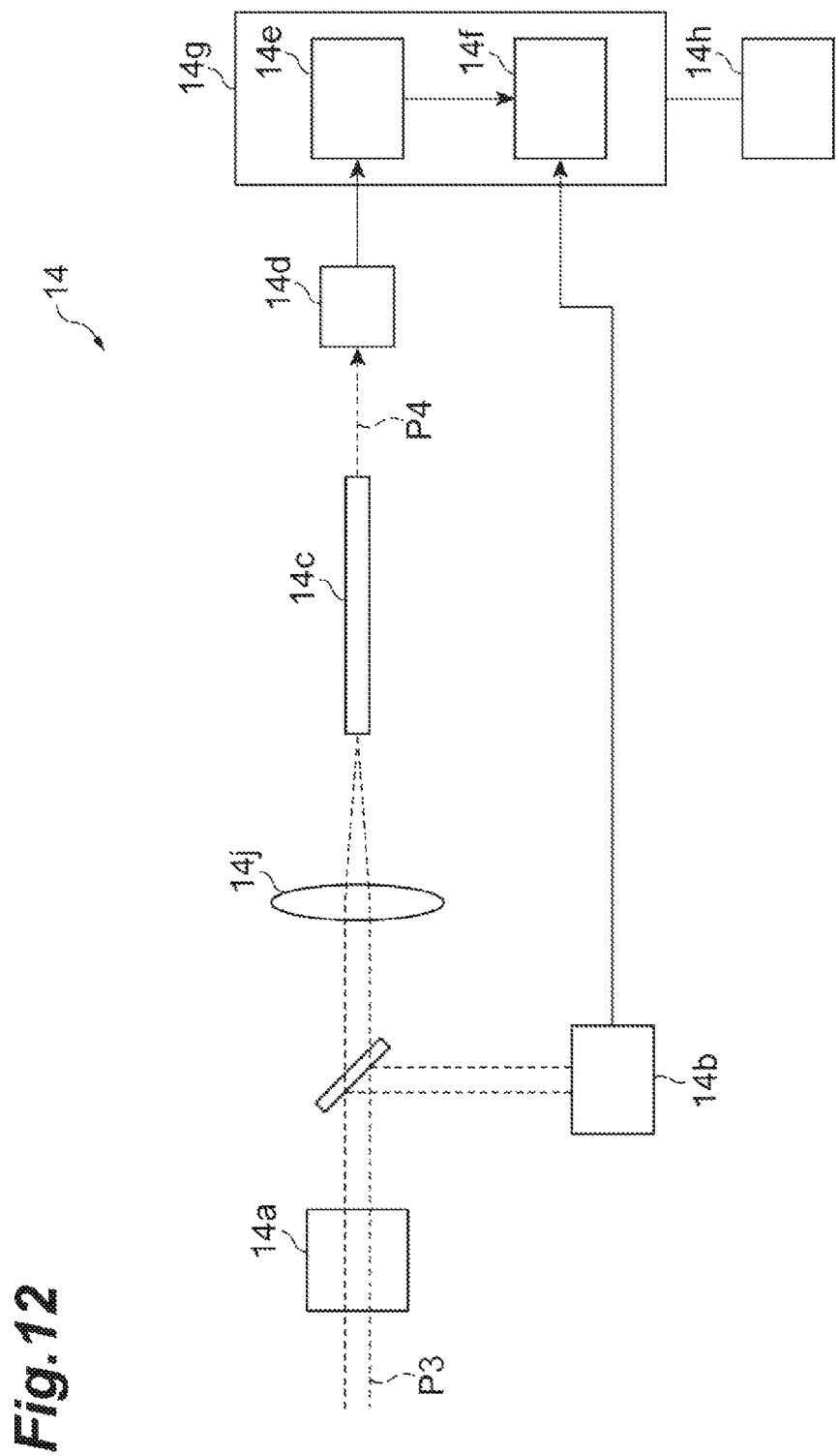
FIG. 12 is a block diagram illustrating an example of a configuration of a waveform measurement unit.

The waveform measurement unit 14 measures the time waveform of the pulsed light P3. FIG. 12 is a block diagram illustrating a configuration example of the waveform measurement unit 14. The waveform measurement unit 14 of this embodiment is intended to measure the time waveform of the pulsed light P3 according to a so-called CESDR measurement method. As illustrated in FIG. 12, the waveform measurement unit 14 includes a light intensity controller (attenuator) 14a, an input spectrum acquisition unit 14b, a light propagation element 14c, an output spectrum acquisition unit 14d, a phase spectrum determination unit 14e, and a waveform calculation unit 14f.

The light intensity controller 14a is optically coupled to the spatial light modulator 124 of the waveform control unit 12. Further, the light intensity controller 14a adjusts the intensity of the pulsed light P3 that is input to the waveform measurement unit 14. Specifically, the light intensity controller 14a changes the intensity of each wavelength component at a predetermined magnification while maintaining an intensity spectrum ratio of the input pulsed light P3. Since the intensity of the pulsed light P3 can be adjusted in the waveform control unit 12 when the waveform control unit 12 has an intensity modulation function, it is possible to omit the light intensity controller 14a.

The input spectrum acquisition unit 14b is optically coupled to the light intensity control unit 14a via the beam splitter, and is optically coupled to the spatial light modulator 124 of the waveform control unit 12. The input spectrum acquisition unit 14b detects the intensity spectrum of the pulsed light P3 (hereinafter referred to as an input intensity spectrum). The intensity spectrum of the pulsed light P3 has, for example, a shape as shown in a graph G11 illustrated in FIGS. 5(a), 6(a), 7(a), 8(a), 9(a), and 10(a). The input spectrum acquisition unit 14b includes, for example, a spectroscopic element such as a grating or a prism, and a photodetector such as a line sensor that detects an intensity of each wavelength component divided by the spectroscopic element. The input spectrum acquisition unit 14b outputs a detection signal indicating the input intensity spectrum to a calculator 14g.

The light propagation element 14c is optically coupled to the light intensity controller 14a through the beam splitter, and optically coupled to the spatial light modulator 124 of the waveform control unit 12. The light propagation element 14c is an optical element inputting the pulsed light P3 and outputting light P4 having an intensity spectrum corresponding to the phase spectrum of the pulsed light P3. That is, the light propagation element 140 induces self-phase modulation to the pulsed light P3 that propagates therein. Here, the self-phase modulation is one of nonlinear optical effects, and is a phenomenon in which a refractive index of a medium such as an optical fiber slightly changes in proportion to the intensity of light propagated in the medium quality and phase modulation occurs. As the light propagation element 14c, for example, an optical element in which a parameter regarding the self-phase modulation (for example, a parameter indicating a nonlinear optical coefficient or n-order dispersion (ii is a positive integer)) is known may be used. In one embodiment, the light propagation element 14c is a highly nonlinear optical fiber such as a photonic crystal fiber. The pulsed light P3 is input to, for example, one end of the light propagation element 14c while being condensed by the condenser lens 14j.

The output spectrum acquisition unit 14d is optically coupled to the light propagation element 14c. The output spectrum acquisition unit 14d detects the intensity spectrum (hereinafter referred to as the output intensity spectrum) of the light P4 output from the light propagation element 14c. The output spectrum acquisition unit 14d includes, for example, a spectroscopic element such as a grating or a prism, and a photodetector such as a line sensor that detects an intensity of each wavelength component divided by the spectroscopic element. The output spectrum acquisition unit 14d outputs a detection signal indicating the output intensity spectrum to the calculator 14g.

The phase spectrum determination unit 14e is electrically coupled to the output spectrum acquisition unit 14d. The phase spectrum determination unit 14e determines the phase spectrum of the pulsed light P3 on the basis of the input intensity spectrum acquired in the input spectrum acquisition unit 14b and the output intensity spectrum acquired in the output spectrum acquisition unit 14d. Specifically, the phase spectrum determination unit 14e sets a virtual phase spectrum and calculates, through simulation, the output intensity spectrum when the pulsed light P3 having the virtual phase spectrum is assumed to be input to the light propagation element 14c. Further, the phase spectrum determination unit 14e acquires the actual output intensity spectrum from the output spectrum acquisition unit 14d. The phase spectrum determination unit 14e repeatedly performs a comparison with the actual output intensity spectrum while deforming the virtual phase spectrum according to an optimization algorithm such as a simulated annealing method so that the calculated output intensity spectrum approaches the actual output intensity spectrum. Through such a process (fitting), a virtual phase spectrum sufficiently close to an actual output intensity spectrum is determined, and the virtual phase spectrum is recognized as the phase spectrum of the pulsed light P3. The phase spectrum determined in the phase spectrum determination unit 14e and the input intensity spectrum acquired in the input spectrum acquisition unit 14b are provided to the modulation correction unit 13c of the control unit 13 as the time waveform information.

The waveform calculation unit 14f is electrically coupled to the input spectrum acquisition unit 14b. Further, the waveform calculation unit 14f is electrically coupled to the phase spectrum determination unit 14e. The waveform calculation unit 14f performs reconstruction of the time waveform of the pulsed light P3 through a frequency-time transform (for example, an inverse Fourier transform) on the basis of the phase spectrum determined in the phase spectrum determination unit 14e and the input intensity spectrum acquired in the input spectrum acquisition unit 14b. The reconstructed time waveform is displayed on the display unit 14h.

The phase spectrum determination unit 14e and the waveform calculation unit 14f may be realized by, for example, one calculator 14g. The calculator 14g is a computer including a CPU and a storage medium. The calculator 14g may be configured with the same computer of the control unit 13 described above. In this case, the time waveform information is stored in a storage medium of a computer.

Although the input spectrum acquisition unit 14b detects the input intensity spectrum in the above example, the input intensity spectrum may be stored in a storage medium of the calculator 14g and the input spectrum acquisition unit 14b may read the input intensity spectrum from the storage medium when the input intensity spectrum is known. In this case, the input spectrum acquisition unit 14b may be realized by the calculator 14g.

Here, processing content in the phase spectrum determination unit 14e of this embodiment will be described in greater detail. To measure the time waveform of the pulsed light P3 having a very short time width such as on the order of attoseconds to nanoseconds, information on the intensity spectrum and the phase spectrum of the pulsed light P3 is necessary. Of these, the intensity spectrum (input intensity spectrum) can be directly measured, whereas direct measurement of the phase spectrum is difficult. Accordingly, the waveform measurement unit 14 of this embodiment sets the virtual phase spectrum, and performs a simulation of propagation within the light propagation element 14c using a parameter regarding the light propagation element 14c on the basis of the virtual phase spectrum and the input intensity spectrum, to calculate a virtual intensity spectrum. The waveform measurement unit 14 compares the virtual intensity spectrum with the output intensity spectrum to calculate a degree of matching between the virtual intensity spectrum and the output intensity spectrum, and evaluates the degree of matching. As the degree of matching, for example, an average or a standard deviation of a value of a difference between the virtual intensity spectrum obtained for each wavelength component and the output intensity spectrum, a least square value, or the like may be used. The degree of matching is evaluated according to whether the degree of matching is equal to or smaller than a predetermined threshold value. If the degree of matching is determined to be insufficient, the virtual intensity spectrum is changed according to a simulated annealing method or a genetic algorithm, a virtual phase spectrum is created again, and the degree of matching with the output intensity spectrum is evaluated. This process is repeated until the degree of matching is evaluated to be sufficient.

In the above-described process, an initial setting of the virtual phase spectrum is important. If the initial setting is far away from the actual phase spectrum, a long time may be required until the degree of matching is evaluated to be sufficient or a convergence on a spectrum of which the degree of matching is insufficient may occur and an original phase spectrum may not be obtained. In particular, when the time waveform of the pulsed light P3 is a double pulse waveform including two ultrashort pulse waveforms or a waveform with low symmetry, the above problem easily occurs. Therefore, the phase spectrum determination unit 14e of this embodiment sets the virtual phase spectrum by deforming the control phase spectrum using the control phase spectrum for controlling the time waveform of the pulsed light P3, which is a basis for creating a phase modulation hologram to be applied to the spatial light modulator 124 of the waveform control unit 12, for example, as an initial value. Thus, by setting the virtual phase spectrum on the basis of the control phase spectrum and changing a phase spectrum shape using, for example, a simulated annealing method, it is possible to determine an original phase spectrum in a short time and accurately.

Figure 13:
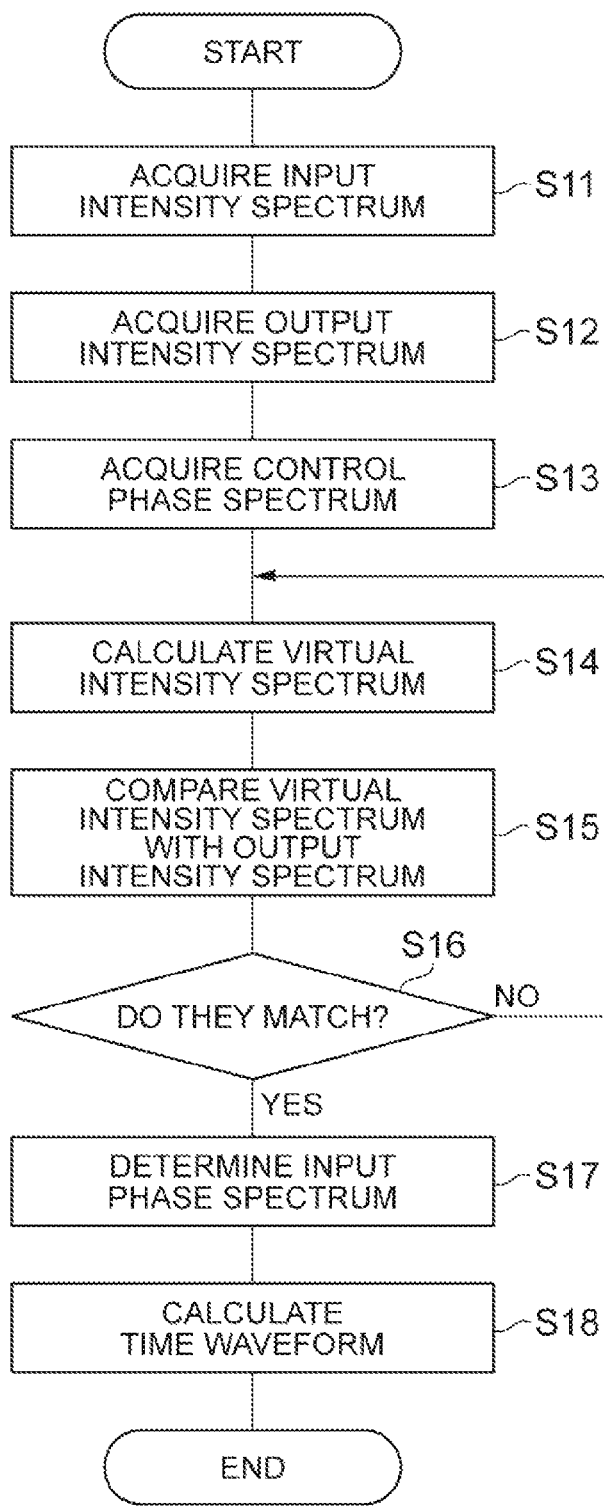
FIG. 13 is a flowchart illustrating an operation of the waveform measurement unit.

FIG. 13 is a flowchart illustrating an operation of the waveform measurement unit 14 of this embodiment. An operation of the waveform measurement unit 14 and a waveform measurement method of this embodiment will be described with reference to FIG. 13. In a state in which the pulsed light P3 is input to the waveform measurement unit 14, first, the input intensity spectrum of the pulsed light P3 is acquired in the input spectrum acquisition unit 14b (step S11). As described above, when the input intensity spectrum is known, step S11 may be realized by the input spectrum acquisition unit 14b reading the input intensity spectrum stored in the storage medium of the calculator 14g. Then, the output intensity spectrum of the light P4 is acquired at the output spectrum acquisition unit 14d (step S12). In the phase spectral determination unit 14e, the control phase spectrum is acquired from the control unit 13 (step S13). Subsequently, a virtual intensity spectrum based on the virtual phase spectrum is calculated (step S14). When the virtual intensity spectrum is first calculated, for example, a control phase spectrum acquired in step S13 is used as the virtual phase spectrum.

Subsequently, the virtual intensity spectrum calculated in step S14 is compared with the output intensity spectrum acquired in step S12, and a degree of matching between the intensity spectra is calculated (step S15). It is also determined whether the degree of matching in step S15 is sufficient (or satisfies a predetermined condition) (step S16). If it is determined that the degree of matching is not sufficient, steps S14 and S15 described above are performed again. If the degree of matching is sufficient, the virtual phase spectrum at this time is determined as the input phase spectrum (step S17). Then, the time waveform of the pulsed light P3 is calculated on the basis of the input phase spectrum determined in step S17 and the input intensity spectrum acquired in step S11 (step S18).

Here, if the control phase spectrum in which the time waveform of the pulsed light P3 is intended to be a desired waveform and the actual phase spectrum of the pulsed light P3 do not match, the control phase spectrum can be corrected so that a time waveform of the phase spectrum of the pulsed light P3 approaches a desired waveform. In this embodiment, the modulation correction unit 13c of the control unit 13 corrects the control phase spectrum on the basis of the phase spectrum measured in the waveform measurement unit 14. The CGH creation unit 13b creates a phase modulation hologram on the basis of the control phase spectrum after correction, and the waveform control unit 12 generates the pulsed light P3 on the basis of the new phase modulation hologram. By repeating the above operation, the time waveform of the pulsed light P3 can further approach the desired waveform.

A method of controlling the time waveform of the pulsed light P3 using the measurement result in the waveform measurement unit 14 will be described in detail. The control of the time waveform of the pulsed light P3 is performed by controlling the phase spectrum of the pulsed light P3. Here, a phase spectrum corresponding to a desired time waveform is $\phi_{target}(\lambda)$, a phase spectrum that is input to the waveform control unit 12 is $\phi^{(k)}_{shaper}(\lambda)$, and a phase spectrum that is measured by the waveform measurement unit 14 is $\phi^{(k)}_{measure}(\lambda)$. Here, $\Delta$, is a wavelength, and k is an ordinal number of an iterative process. The control of the time waveform of the pulsed light P3 is performed according to the following steps (1) to (5).

(1) The waveform measurement unit 14 measures the phase spectrum of the pulsed light P3 to obtain $\phi^{(1)}_{measure}(\lambda)$.

(2) $\phi^{(1)}_{shaper}(\lambda) = \phi_{target}(\lambda) - \phi^{(1)}_{measure}(\lambda)$, and the waveform control is performed by the waveform control unit 12.

(3) The phase spectrum of the pulsed light P3 is measured again by the waveform measurement unit 14 to obtain $\phi^{(2)}_{measure}(\lambda)$.

(4) $\phi^{(2)}_{shaper}(\lambda) = \phi_{target} - \phi^{(2)}_{measure}(\lambda) + \phi^{(1)}_{shaper}(\kappa)$, and waveform control is performed by the waveform control unit 12.

(5) The procedures (3) and (4) are repeatedly performed until $\phi_{target}(\lambda) - \phi^{(k)}_{measure}(\lambda)$ becomes an allowable value.

By the above procedures (1) to (5), feedback control of the time waveform based on the measurement result of the waveform measurement unit 14 can be performed.

Effects obtained by the waveform measurement device (waveform measurement unit 14) and the pulsed light generating device 1A of this embodiment described above are summarized as follows. That is, according to the waveform measurement unit 14 and the pulsed light generating device 1A of this embodiment, the intensity spectrum and the phase spectrum of the pulsed light P3 of which the direct measurement of the time waveform is difficult can be separately obtained, and the time waveform of the pulsed light P3 can be calculated on the basis of the intensity spectrum and the phase spectrum. Further, in the waveform measurement unit 14, the phase spectrum determination unit 14e sets the virtual phase spectrum by deforming the control phase spectrum. The phase spectrum forming the time waveform of the pulsed light P3 is mainly influenced by the control phase spectrum. Therefore, the phase spectrum is not often greatly changed from the control phase spectrum. Accordingly, by setting the virtual phase spectrum on the basis of the control phase spectrum, it is possible to reduce the calculation amount in the phase spectrum determination unit 14e and shorten a time required for measurement of the phase spectrum.

Further, as in this embodiment, the phase spectrum determination unit 14e may perform a calculation of optimizing the virtual phase spectrum so that the output intensity spectrum which is calculated when the pulsed light P3 having the input intensity spectrum and the virtual phase spectrum is assumed to be input to the light propagation element 14c approaches the output intensity spectrum acquired in the output spectrum acquisition unit 14d, and use the control phase spectrum as an initial value of the virtual phase spectrum in the operation. Accordingly, it is possible to obtain the virtual phase spectrum close to an actual phase spectrum accurately and in a short time.

First Modification Example

Figure 14:
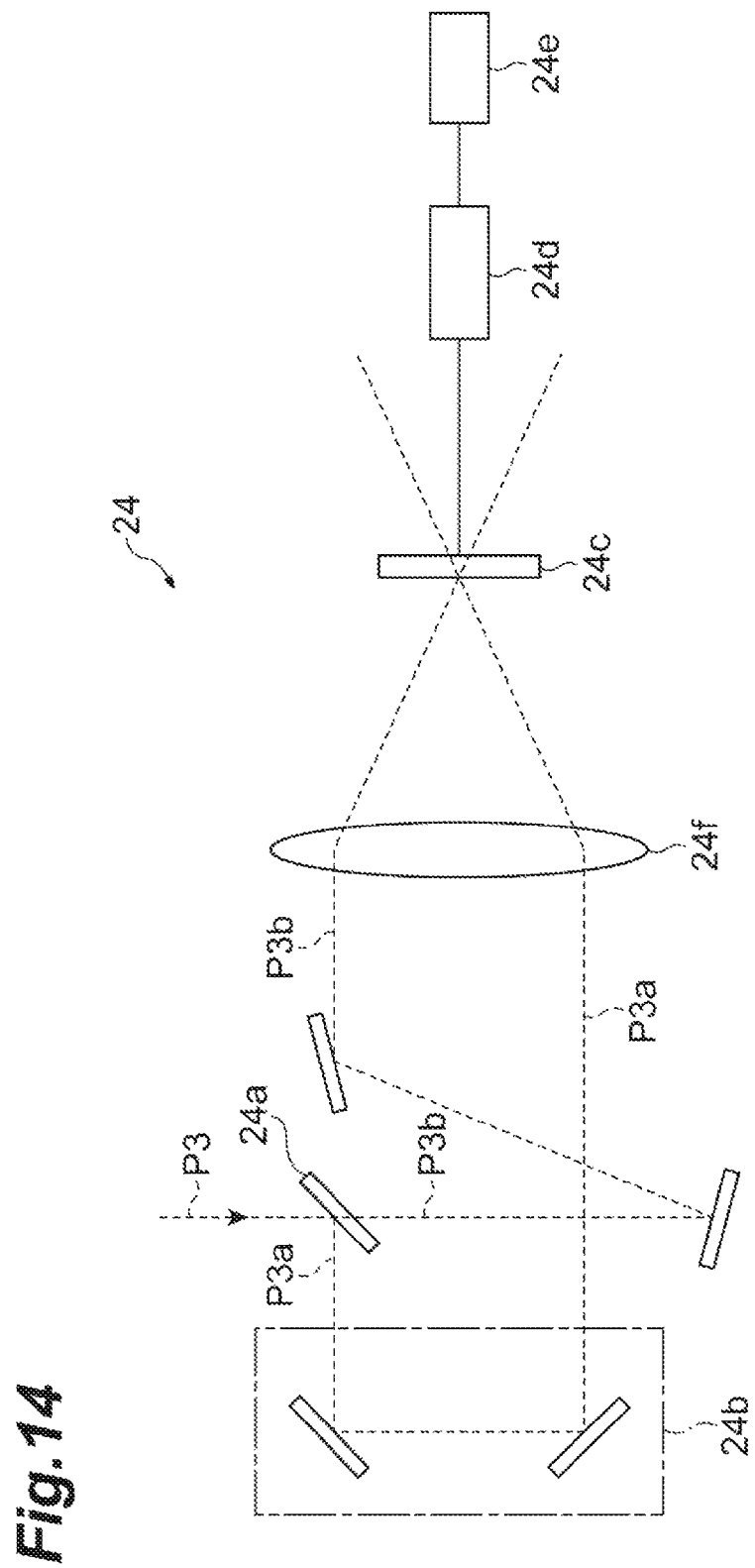
FIG. 14 is a diagram conceptually illustrating a configuration of the waveform measurement unit according to a modification example.

A first modification example relating to the waveform measurement device and the pulsed light generating device 1A according to the embodiment will be described. FIG. 14 is a diagram conceptually illustrating a configuration of a waveform measurement unit 24 according to this modification example. The waveform measurement unit 14 of the above embodiment measures the time waveform of the pulsed light P3 according to a so-called CESDR measurement method, whereas the waveform measurement unit 24 of this modification example measures the time waveform of the pulsed light P3 using a Frequency Resolved Optical Gating (FROG) method. The pulsed light generating device 1A of the above embodiment may include the waveform measurement unit 24 of this modification example in place of the waveform measurement unit 14.

Figure 15:
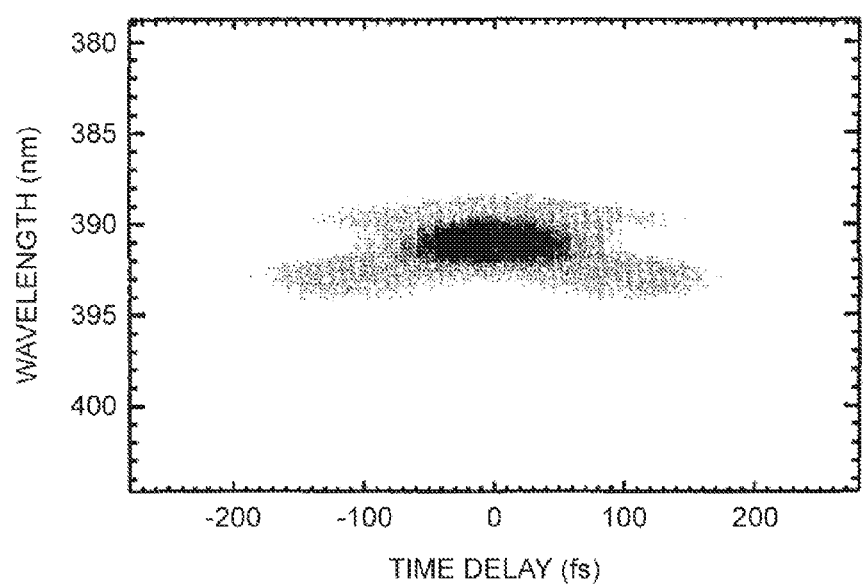
FIG. 15 illustrates an example of a spectrogram.

The waveform measurement unit 24 acquires time waveform information of the pulsed light P3 as follows. That is, the waveform measurement unit 24 gates a time-divided portion of the pulsed light P3 to cut out the portion using an optical element having a nonlinear optical effect. The waveform measurement unit 24 compares an actually measured value and a calculated value for a spectrogram obtained by measuring the intensity spectrum of the portion (a waveform in which an intensity spectrum waveform at each time of the pulsed light is represented by a time axis and a wavelength axis) or uses characteristics in which a time waveform causing a certain spectrograms is limited to reconstruct the time waveform of the pulsed light P3. FIG. 15 is an example of the spectrogram.

More specifically, the waveform measurement unit 24 changes the virtual time waveform so that a calculated value of the spectrogram calculated through simulation according to an optimization algorithm such as a Fletcher Reeves method or a Porabia method approaches an actually measured value. This change is repeated until a degree of matching between the calculated and the actually measured value of the spectrogram is evaluated as to be sufficient. Through such a process, a virtual time waveform sufficiently close to an actually measured spectrogram is determined, and the virtual time waveform is recognized as the time waveform of the pulsed light P3. The phase spectrum of the pulsed light P3 is determined by a time-frequency transform. As illustrated in FIG. 14, the waveform measurement unit 24 includes a beam splitter 24a, a delay line 24b, a nonlinear optical element 24c, a spectrum detector 24d, and a calculator 24e. The beam splitter 24a splits the pulsed light P3 into pulsed light P3a and P3b. The delay line 24b gives a time delay to one of the split pulsed light P3a and P3b. Thus, by giving the time delay to any one of the split pulsed light P3a and P3b, a time at which the pulsed light P3a and P3b overlaps is changed. Accordingly, a gated time can be operated. Thereafter, the pulsed light P3a and P3b passes through the lens 24f and overlaps in the nonlinear optical element 24c.

The nonlinear optical element 24c induces a nonlinear optical effect of the pulsed light P3a and P3b. Here, the nonlinear optical effect used for FROG is second harmonic generation that is a second-order nonlinear optical effect, third harmonic generation that is a third-order nonlinear optical effect, an optical Kerr effect, or the like. Further, as a nonlinear optical material constituting the nonlinear optical element 24c, for example, SHG crystal, THG crystal, or glass may be used.

The spectrum detector 24d measures the intensity spectrum of the light output from the nonlinear optical element 24c. The spectrum detector 24d includes, for example, a spectroscopic element such as a grating or a prism, and a line sensor that detects the intensity of each wavelength component divided by the spectroscopic element.

The calculator 24e includes, for example, a computer including a CPU and a storage medium. The calculator 24e determines a time waveform of the pulsed light P3 on the basis of a spectrogram that is a spectrogram of the pulsed light P3 and a virtual spectrogram that is a virtual spectrogram of the pulsed light P3.

The waveform measurement unit (waveform measurement device) is not limited to the above embodiment, and may include, for example, the configuration of the waveform measurement unit 24 of this modification example. Even in this case, it is possible to achieve the same effects as those in the above embodiment by using the time waveform calculated by a frequency-time transform based on a control phase spectrum and an input intensity spectrum as an initial value in the calculator 24e.

Second Modification Example

Next, another example of a method of controlling the time waveform of the pulsed light P3 using the measurement result in the waveform measurement unit 14 of the above embodiment will be described. In the above embodiment, the phase spectrum $\phi^{(k)}_{measure}(\lambda)$ measured by the waveform measurement unit 14 may be used so that the phase spectrum $\phi^{(k)}_{shaper}(\lambda)$ that is input to the waveform control unit 12 approaches a phase spectrum $\phi_{shaper}(\lambda)$. In such a case, if the measured spectrum intensity $I^{(k)}_{measure}(\lambda)$ is equal to a spectrum intensity $I_{target}(\lambda)$ corresponding to a phase spectrum $\phi_{target}(\lambda)$, a desired waveform can be designed finally using $I^{(k)}_{measure}$ and $\phi^{(k)}_{measure}(\lambda)$. However, if a deviation is generated between $I^{(k)}_{measure}$ and $I_{target}(\lambda)$, the time waveform of the pulsed light P3 is changed from a desired waveform.

Therefore, in this modification example, a phase spectrum $\phi^{(1)}_{shaper}(\lambda)$ for realizing an amplitude $A^{(1)}_{target}(t)$ of the desired time waveform, which is the phase spectrum that is input to the waveform control unit 12, is first obtained. Examples of a method of obtaining the phase spectrum $\phi^{(1)}_{shaper}(\lambda)$ may include a GS method, a method based on an iterative Fourier transform method such as an Input-Output, Input-Input method, which has been proposed by Fineup, and a method of designing a desired waveform by changing a phase pixel by pixel, such as ORA, SA, or GA. In this case, a pre-measured spectrum intensity $I^{(1)}_{measure}(\lambda)$ of the input light may be used for design of the phase spectrum $\phi^{(1)}_{shaper}(\lambda)$.

Next, the obtained phase spectrum $\phi^{(1)}_{shaper}(\lambda)$ is input to the spatial light modulator 124, and modulation of the input light P1 is performed. The pulsed light P3 after the modulation is measured and an amplitude of the phase spectrum $\phi^{(1)}_{measure}(\lambda)$ or the time waveform $A^{(1)}_{measure}(t)$ is obtained. When the phase spectrum $\phi^{(1)}_{measure}(t)$ is measured, the time waveform $A^{(1)}_{measure}(t)$ is derived using a spectrum intensity $I^{(1)}_{measure}(\lambda)$. Then, $A^{(1)}_{target}(t)$ is compared with $A^{(1)}_{measure}(t)$ and it is checked whether $A^{(1)}_{measure}(t)$ is a desired result. If $A^{(1)}_{measure}(t)$ is not within a predetermined range, $A^{(2)}_{target}(t)$ is newly created, and a phase spectrum $\phi^{(2)}_{shaper}(\lambda)$ that is input to the waveform control unit 12 is obtained. Specifically, $A^{(1)}_{target}(t)$ is changed using a weight w so that a portion in which $A^{(1)}_{measure}(t)$ is greater than $A^{(1)}_{target}(t)$ becomes small at the time of measurement of $A^{(2)}_{measure}(t)$, and a portion in which $A^{(1)}_{measure}(t)$ is smaller than $A^{(1)}_{target}(t)$ becomes large at the time of measurement of $A^{(2)}_{measure}(t)$. Specifically, Equations (1) and (2) below are obtained.

$$A^{(k+1)}_{target}(t) = w \times A^{(k)}_{target}(t) \quad (1)$$

$$w^{(k)} = A^{(k)}_{target}(t) / A^{(k)}_{measure}(t) \quad (2)$$

Using the equations, an amplitude $A^{(2)}_{target}(t)$ of the time waveform is derived, and then a phase spectrum $\phi^{(2)}_{shaper}(\lambda)$ that is input to the waveform control unit 12 is obtained. In this case, the phase spectrum $\phi^{(1)}_{shaper}(\lambda)$ used a previous time may also be used as an initial phase for design of the phase spectrum $\phi^{(2)}_{shaper}(\lambda)$. By repeating the above process, it is possible to design a desired phase pattern in consideration of an influence of an optical system.

The waveform measurement device and the pulsed light generating device according to the aspect of the present invention are not limited to the above-described embodiments, and various other modifications are possible. For example, the CESDR and the FROG have been illustrated as schemes of measuring the time waveform of the pulsed light in the embodiments and the modification examples, but the aspect of the present invention is not limited thereto and can be applied to various measurement schemes.

INDUSTRIAL APPLICABILITY

According to one aspect of the present invention, it is possible to provide a waveform measurement device capable of measuring a phase spectrum accurately and in a short time, and the pulsed light generating device.

REFERENCE SIGNS LIST

1A: pulsed light generating device, 11: light output unit, 12: waveform control unit, 13: control unit, 13*a*: operation control unit, 13*b*: CGH creation unit, 13*c*: modulation correction unit, 14: waveform measurement unit, 14*a*: light intensity controller, 14*h*: input spectrum acquisition unit, 14*c*: light propagation element, 14*d*: output spectrum acquisition unit, 14*e*: phase spectrum determination unit, 14*f*: waveform calculation unit, 14*g*: calculator, 14*h*: display unit, 14*j*: condenser lens, 121: beam splitter, 122: spectroscopic element, 123: imaging lens, 124: spatial light modulator, L1: optical axis, P1: input light, P2: beat light, P3: pulsed light, $P\lambda_1$ to $P\lambda_n$: wavelength component.

The invention claimed is:

1. A waveform measurement device for measuring a time waveform of pulsed light obtained by modulating a phase of input light including two or more wavelength components for each wavelength in a spatial light modulator to which a phase modulation hologram based on a control phase spectrum for controlling the time waveform of the pulsed light is presented, the waveform measurement device comprising:
a first detector configured to detect the pulsed light and output an input intensity spectrum data being an intensity spectrum of the pulsed light;
an optical element configured to input the pulsed light and output light having an intensity spectrum corresponding to a phase spectrum of the pulsed light;
a second detector configured to detect the light output from the optical element and output an output intensity spectrum data being an intensity spectrum of the light output from the optical element; and
a computer electrically coupled to the first detector and the second detector and configured to input the input intensity spectrum data and the output intensity spectrum data,
wherein the computer is programmed to determine the phase spectrum of the pulsed light by comparing an output intensity spectrum calculated when the pulsed light having an input intensity spectrum and a virtual phase spectrum is assumed to be input to the optical element with the output intensity spectrum data, and calculate a time waveform of the pulsed light, using a frequency-time transform, based on the determined phase spectrum and the input intensity spectrum data, and
wherein the computer is programmed to set the virtual phase spectrum by deforming the control phase spectrum.

2. The waveform measurement device according to claim 1,
wherein the computer is programmed to perform a calculation for optimizing the virtual phase spectrum so that the calculated output intensity spectrum approaches the output intensity spectrum data, and use the control phase spectrum as an initial value of the virtual phase spectrum in the calculation.

3. A pulsed light generating device, comprising:
a light source configured to generate input light including two or more wavelength components;
a spatial light modulator optically coupled to the light source and configured to modulate a phase of the input light to generate the pulsed light, for each wavelength based on a phase modulation hologram;
a controller configured to control the spatial light modulator; and
a waveform measurement device according to claim 1,
wherein the phase modulation hologram is determined so that the time waveform of the pulsed light approaches a desired waveform on the basis of a measurement result in the waveform measurement device.

4. A waveform measurement method for measuring a time waveform of pulsed light, comprising:
detecting the pulsed light and outputting an input intensity spectrum data being an intensity spectrum of the pulsed light;
transforming the pulsed light to light having an intensity spectrum corresponding to a phase spectrum of the pulsed light;
detecting the light output from the optical element and output an output intensity spectrum data being an intensity spectrum of the light output from the optical element; and
determining the phase spectrum of the pulsed light by comparing an output intensity spectrum calculated when the pulsed light having an input intensity spectrum and a virtual phase spectrum is assumed to be input to the optical element with the output intensity spectrum data, and
calculating a time waveform of the pulsed light, using a frequency-time transform, based on the determined phase spectrum and the input intensity spectrum data, wherein
the determining sets the virtual phase spectrum by deforming the control phase spectrum.

5. The waveform measurement method according to claim 4, wherein the determining performs a calculation for optimizing the virtual phase spectrum so that the calculated output intensity spectrum approaches the output intensity spectrum data, and uses the control phase spectrum as an initial value of the virtual phase spectrum in the calculation.

* * * * *